United States Patent
Nakao et al.

(10) Patent No.: US 8,121,844 B2
(45) Date of Patent: Feb. 21, 2012

(54) DIMENSION MEASUREMENT SYSTEM

(75) Inventors: Kengo Nakao, Tokyo (JP); Hidetaka Yamashita, Tokyo (JP); Katsumi Hirano, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/992,477

(22) PCT Filed: May 26, 2009

(86) PCT No.: PCT/JP2009/059934
§ 371 (c)(1),
(2), (4) Date: Nov. 12, 2010

(87) PCT Pub. No.: WO2009/148003
PCT Pub. Date: Dec. 10, 2009

(65) Prior Publication Data
US 2011/0066439 A1 Mar. 17, 2011

(30) Foreign Application Priority Data
Jun. 2, 2008 (JP) ................................ 2008-145151

(51) Int. Cl.
*G10L 21/00* (2006.01)
(52) U.S. Cl. .................... 704/270.1; 704/233; 381/94.3; 381/71.6; 381/71.13; 381/71.7; 381/56
(58) Field of Classification Search ............. 704/270.1, 704/233; 702/158, 162, 154; 455/423, 436; 370/328, 333; 381/71.6, 56, 328, 312, 316, 381/321, 320, 71.13, 71.7
See application file for complete search history.

(56) References Cited

U.S. PATENT DOCUMENTS

| | | | | |
|---|---|---|---|---|
| 5,208,864 A | * | 5/1993 | Kaneda | 704/258 |
| 5,276,765 A | * | 1/1994 | Freeman et al. | 704/233 |
| 5,280,524 A | * | 1/1994 | Norris | 379/388.02 |
| 5,664,014 A | * | 9/1997 | Yamaguchi et al. | 379/430 |
| 5,721,783 A | * | 2/1998 | Anderson | 381/328 |
| 5,815,582 A | * | 9/1998 | Claybaugh et al. | 381/71.6 |
| 5,825,897 A | * | 10/1998 | Andrea et al. | 381/71.6 |
| 7,366,656 B2 | * | 4/2008 | Furst-Yust et al. | 704/200.1 |
| 7,502,484 B2 | * | 3/2009 | Ngia et al. | 381/320 |

(Continued)

FOREIGN PATENT DOCUMENTS

JP 3-100408 A 4/1991

(Continued)

OTHER PUBLICATIONS

"Ubiquitous Operation Assist in the Iron Foundry—Method and Approach." The Institute of Systems, Control, and Information Engineers. vol. 52, No. 4, pp. 123-129. Apr. 15, 2008.

(Continued)

*Primary Examiner* — Vijay B Chawan
(74) *Attorney, Agent, or Firm* — Birch, Stewart, Kolasch & Birch, LLP (57) ABSTRACT

A dimension measurement system is provided. The dimension measurement system includes a speech I/O device fit in an ear canal of a worker, generating a voice signal from vibration in the air emitted from an eardrum of the worker and propagated inside the ear canal, and outputting the voice signal and an information processing device realizing a speech recognition function recognizing a measurement value of a dimension of an object from the voice signal that the speech I/O device output and a judgment function judging if the measurement value satisfies a reference value of the object.

10 Claims, 9 Drawing Sheets

U.S. PATENT DOCUMENTS

| | | | |
|---|---|---|---|
| 7,914,468 B2* | 3/2011 | Shalon et al. | 600/590 |
| 2002/0116187 A1* | 8/2002 | Erten | 704/233 |
| 2006/0132382 A1* | 6/2006 | Jannard | 345/8 |
| 2006/0253278 A1* | 11/2006 | Furst-Yust et al. | 704/209 |
| 2007/0291953 A1* | 12/2007 | Ngia et al. | 381/71.6 |

FOREIGN PATENT DOCUMENTS

| | | |
|---|---|---|
| JP | 7-134793 A | 5/1995 |
| JP | 9-269218 A | 10/1997 |
| JP | 11-228047 A | 8/1999 |
| JP | 2000-1274 A | 1/2000 |
| JP | 2001-171934 A | 6/2001 |
| JP | 2002-310642 A | 10/2002 |
| JP | 2003-161647 A | 6/2003 |
| JP | 2003-295883 A | 10/2003 |
| JP | 2005-285051 A | 10/2005 |
| JP | 2007-24956 A | 2/2007 |
| JP | 2007-193661 A | 8/2007 |
| JP | 2008-62733 A | 3/2008 |
| WO | WO 02/054132 A2 | 7/2002 |

OTHER PUBLICATIONS

International Search Report for PCT/JP2009/059934 dated Jun. 30, 2009.

* cited by examiner

| ID | LENGTH (m) | WIDTH (m) | THICKNESS (mm) | LENGTH TOLERANCE (mm) | WIDTH TOLERANCE (mm) | THICKNESS TOLERANCE (mm) |
|---|---|---|---|---|---|---|
| 110 | 0.6 | 0.8 | 15 | 5 | 5 | 1 |
| 120 | 0.4 | 0.4 | 10 | 5 | 5 | 1 |
| 130 | 0.5 | 0.5 | 10 | 5 | 5 | 1 |
| 140 | 3 | 1.5 | 20 | 10 | 10 | 1 |
| 210 | 1.5 | 1.5 | 40 | 10 | 10 | 1 |
| 220 | 4 | 5 | 20 | 10 | 10 | 1 |
| 230 | 10 | 4 | 30 | 10 | 10 | 1 |
| 240 | 8 | 3 | 10 | 10 | 10 | 1 |
| ... | ... | ... | ... | ... | ... | ... |

| TERM | TYPE | UNIT |
|---|---|---|
| THICK | THICKNESS | mm |
| LENGTH | VERTICAL LENGTH | m |
| WIDTH | HORIZONTAL LENGTH | m |
| DIA | DIAGONAL | ° (ANGLE) |
| CA | CAMBER | mm |
| ... | ... | ... |

Fig. 8

| ORDER / 801 | TYPE / 802 | UNIT / 803 |
|---|---|---|
| 1 | THICKNESS | mm |
| 2 | LENGTH | m |
| 3 | WIDTH | m |
| ... | ... | ... |

800

DIMENSION MEASUREMENT SYSTEM

TECHNICAL FIELD

The present application relates to a dimension measurement system for measuring a product or semifinished product, more particularly relates to a dimension measurement system for measuring a product or semifinished product in a noisy environment or bad work posture.

BACKGROUND ART

In machining apparatuses or processing apparatuses installed inside factories, the practice is to measure the dimensions of parts of products or semifinished products so as to control the machined state or processed state. In this sort of control, generally, a worker uses a caliper or tape measure to measure a specific object and confirm whether the measurement value is within a product reference value. Normally, the measurement value is manually input into a computer and the computer is used to confirm the product reference value and input value.

To measure dimensions in this way, there has been proposed a dimension measurement system which uses a digital caliper capable of transmitting measurement data so as to measure an object (Patent document 1 as described below). This dimension measurement system transmits the measurement value measured by the digital caliper to a control computer. The control computer then compares the stored reference value for the object with the measurement data and outputs "pass" or "fail" by voice. Further, there has been proposed a voice communication device enabling reliable conversation even in loud noise (Patent document 2 as described below).

PRIOR ART DOCUMENTS

Patent Documents

[Patent document 1] Japanese Laid-Open Patent Publication No. 9-269218
[Patent document 2] Japanese Laid-Open Patent Publication No. 2007-159109

SUMMARY OF INVENTION

Technical Problem

In the dimension measurement system and the voice communication device proposed in the past, manual input of measurement values by a worker is unnecessary, so dimension measurement work can be streamlined. However, the objects that can be measured by a digital caliper and other such measurement means have dimensions that are comparatively small. If the dimensions are large, the objects are preferably measured by a tape measure or other such measurement device. For example, the steel measured at a steel plant will have a length and width of several meters and will have to be measured by a tape measure or carpenter's square instead of a digital caliper. Therefore, there is the inconvenience that worker has to measure the steel with a tape measure or carpenter's square, record the measurement value on paper, and once again manually input the record into the control computer, that is, manual work is required.

Further, in the above dimension measurement system, the judgment of whether the measurement value is within a reference value had been performed by the computer judging passing/failure and notifying the result to a worker by voice output. Using voice to inform the pass/fail results to a worker in this way prevents the measurement work of a worker performed using sight, that is, measurement of dimensions, from being interrupted and therefore increases the work efficiency. However, with this voice output, in a noisy environment, communicating the result to a worker is difficult. For example, a steel plant is an environment with 90 dB or more of noise. Communicating passing/failure by voice is difficult. Therefore, there has been the issue that judgment of passing/failure by sight is being demanded and it has not been possible to use voice output to improve the work efficiency of measurement.

Solution to Problem

In consideration of the above points, the object of the present application is to provide a dimension measurement system not requiring the work of recording measurement values even in measurement work where the measurement results cannot be obtained directly from the measurement means as electronic data and capable of communicating the pass/fail results to a worker even under a loud noise.

According to an aspect of the invention, a dimension measurement system is provided. The dimension measurement system includes a speech I/O device fit in an ear canal of a worker, generating a voice signal from vibration in the air emitted from an eardrum of the worker and propagated inside the ear canal, and outputting the voice signal and an information processing device realizing a speech recognition function recognizing a measurement value of a dimension of an object from the voice signal that the speech I/O device output and a judgment function judging if the measurement value satisfies a reference value of the object.

ADVANTAGEOUS EFFECTS OF INVENTION

According to this dimension measurement system, a speech I/O device is fit in the ear canal of a worker and directly receives as input a voice signal emitted from the eardrum, thereby enabling the conversion of a measurement value having reduced external background noise into voice data. Therefore, this makes work of manually inputting or recording measurement values unnecessary and therefore allows the work efficiency in dimension measurement to be raised.

Further, according to this dimension measurement system, because the speech I/O device is mounted in the ear canal of the worker and directly receives as input a voice signal emitted from the eardrum, the entry of external background noise can be reduced. Further, as is the case with a bone conduction microphone or pharyngeal microphone, noise from the bones of the worker (sounds other than a human voice; for example, background noise) is not easily picked up. Therefore, to remove noise in this dimension measurement system, it is sufficient to remove noise from the voice output after the external background noise has been reduced. Therefore, this dimension measurement system does not require a noise canceller that performs complicated processing for removing a plurality of noises for each environment.

Further, according to this dimension measurement system, as the speech I/O device is fit in the ear canal of the worker, it is possible to transmit pass/fail results to the worker even in a noisy environment. Therefore, pass/fail judgment using sight is made unnecessary and the work efficiency of dimension measurement work can be raised.

BRIEF DESCRIPTION OF THE DRAWINGS

These and other objects and features of the present invention will become clearer from the following description of the preferred embodiments given with reference to the attached drawings, wherein.

DESCRIPTION OF EMBODIMENT

Below, an embodiment of the present application will be explained with reference to the drawings.

Figure 1:
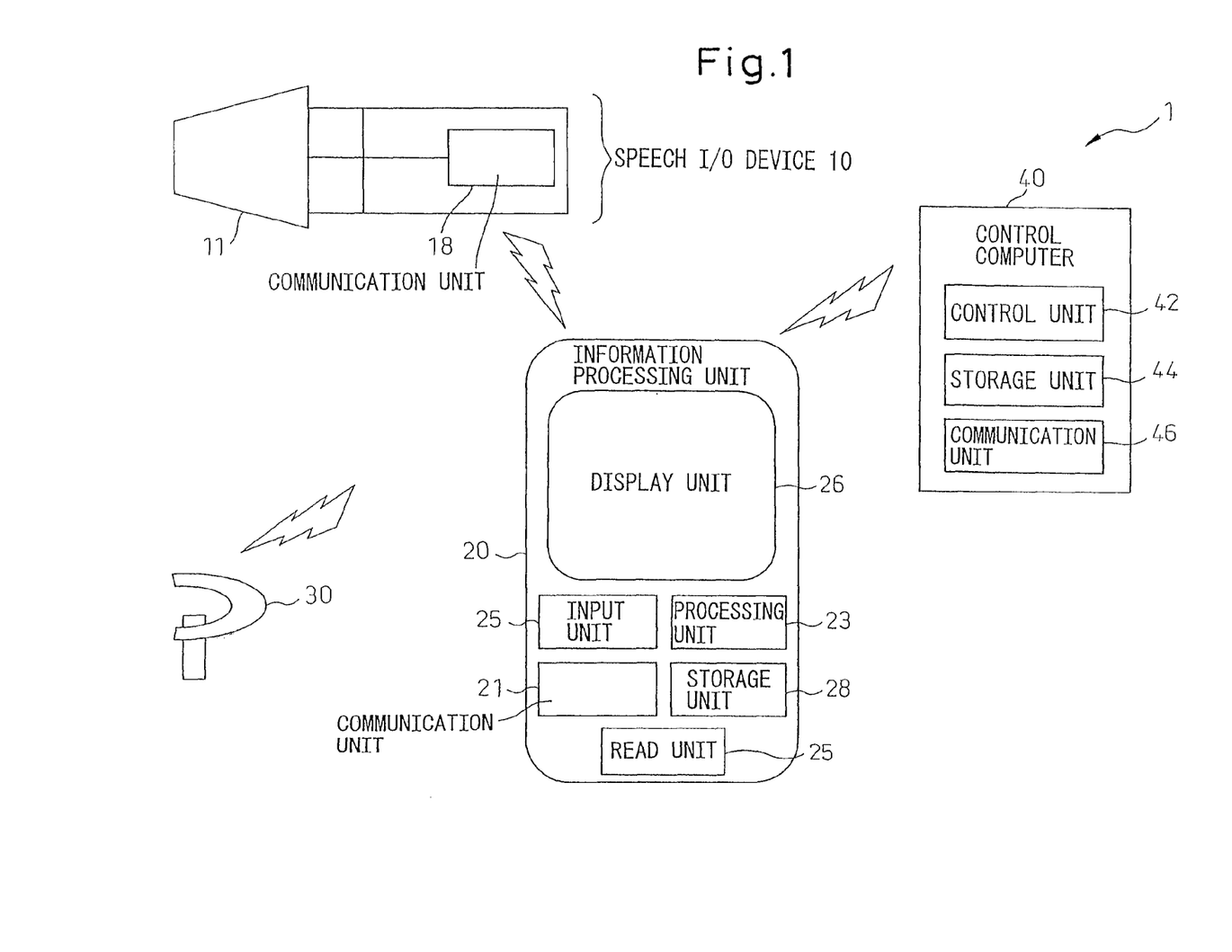
FIG. 1 is a view depicting an example of a functional configuration of a dimension measurement system.

Using FIG. 1, an example of the functional configuration of a dimension measurement system will be explained. The dimension measurement system 1 includes a speech I/O device 10, information processing device 20, and digital micrometer 30. The speech I/O device 10 has an in-ear microphone 11 obtaining the content of speech of a worker as a voice signal and outputting the voice signal and a communication unit 18 for input and output of the voice signal to and from the information processing device 20. Further, the information processing device 20 has a communication unit 21, processing unit 23, read unit 27, input unit 25, display unit 26, and storage unit 28. The information processing device 20 and digital micrometer 30 are wirelessly connected to a control computer 40 for transmission of data. Below, each device included in the dimension measurement system 1 will be explained.

Of the speech I/O device 10, at least the in-ear microphone 11 is fit in the ear canal of a worker. The in-ear microphone 11 captures as an input signal a voice signal emitted by vibration of the eardrum when the worker speaks and propagated through the air in the ear canal. The in-ear microphone 11 may use the art as set forth in, for example, Japanese Laid-Open Patent Publication No. 2001-157292. The voice signal received as input by the in-ear microphone 11 is input to the communication unit 18.

The communication unit 18 of the speech I/O device 10 wirelessly sends and receives microphone I/O signals to and from the information processing device 30. The communication unit 18 may use any wireless communication technology. As examples of wireless communication technology that may be applied to the communication unit 18, there are infrared communication of the IrDA (infrared Data Association) etc., Bluetooth®, wireless LAN (Local Area Network), UWB (Ultra Wide Band), WUSB (Wireless Universal Serial Bus), Zig-Bee®, FM transmitter, and other such technology.

Referring to FIG. 1 again, the communication unit 21 of the information processing device 20 receives or sends voice signals from or to the speech I/O device 10 and, further, wirelessly receives and sends signals from and to the control computer 40. The communication unit 21 may use wireless communication technology similar to the communication unit 18.

The processing unit 23 is, for example, a CPU (central processing unit). The processing unit 23 runs a program stored in the storage unit 28 to thereby realize a later explained speech recognition function and judgment function.

The speech recognition function is a function carrying out speech recognition on a voice signal received by the communication unit 21 as an input signal. The speech recognition function may use any prior speech recognition technology. The speech recognition function does not require a special acoustic model and is capable of speech recognition using a normal acoustic model for voice signals propagated through the air.

An "acoustic model" is data expressing the probability of appearance of each word. This probability of appearance may be given as the probability of simple appearance regardless of the existence of other words. Further, the probability of appearance may also be given as the probability of next appearance predicated on a certain word being recognized. By using this acoustic model, the recognition efficiency can be raised in comparison to speech recognition based only on the acoustic model.

The judgment function is a function confirming if the measurement value recognized by the above speech recognition function satisfies a reference value (tolerances of the width, length, diagonal, camber, perpendicularity, thickness, etc.) indicating the specifications of the object, that is, product or semifinished product (for example steel), stored in the storage unit 28. For example, if the measured thickness of the object obtained is 95 mm and the tolerance is 100 mm±10 mm, the object satisfies the reference value. On the other hand, if the thickness of the object is 115 mm, it does not satisfy the above reference value. If the reference value is not satisfied, the worker can be prompted to pay attention to it by voice through the in-ear microphone 11 of the speech I/O device 10.

The read unit 27 reads the ID of the object (for example, bar code or RFID) or an ID as set forth in the work manual (bar code etc.) The read unit 27 is, for example, a bar code reader or RFID reader. In the product specification, each object has an ID. The read unit 27 can read the ID of the object (for example, bar code or RFID) or the ID set forth in the work manual (bar code etc; in this case, the work manual designates the place where the object is set). The information processing device 20 matches the ID of the object read by the read unit 27 against the IDs stored in the storage unit 28 and confirms that the ID of the object matches the ID included in the later explained product specification information.

The storage unit 28 stores product specification information as well as a program etc. for executing each processing of the information processing device 20. The storage unit 28 is made up of a RAM, ROM, or the like. Further, the communication unit 21 receives product specification information transmitted from the control computer 40 and further transmits the actual data of the object finished being measured to the control computer 40.

The display unit 26 can display the product specification information of the object and the measurement value. However, as mentioned above, the worker may perform measurement work even without looking at the display of the display unit 26.

The information processing device 20 may be, for example, a portable computer or a PDA (personal digital assistant).

The digital micrometer 30 is a measurement means for measuring the thickness of the object. It has a communication unit 32 (not illustrated) transmitting the measurement value to the information processing device 20. The measurement value is judged by the judgment function as mentioned above. The wireless communication technology of the communication unit 32 may use the known art explained with reference to the communication unit 18.

The control computer 40 has a processing unit 42 made up of a CPU or the like, a storage unit 44 made up of a RAM or ROM, and a communication unit 46. The wireless communication technology of the communication unit 46 may use the known art explained with reference to the communication unit 18. The storage unit 44 stores a large number of data for objects to be transmitted to the information processing device 20.

Figure 2:
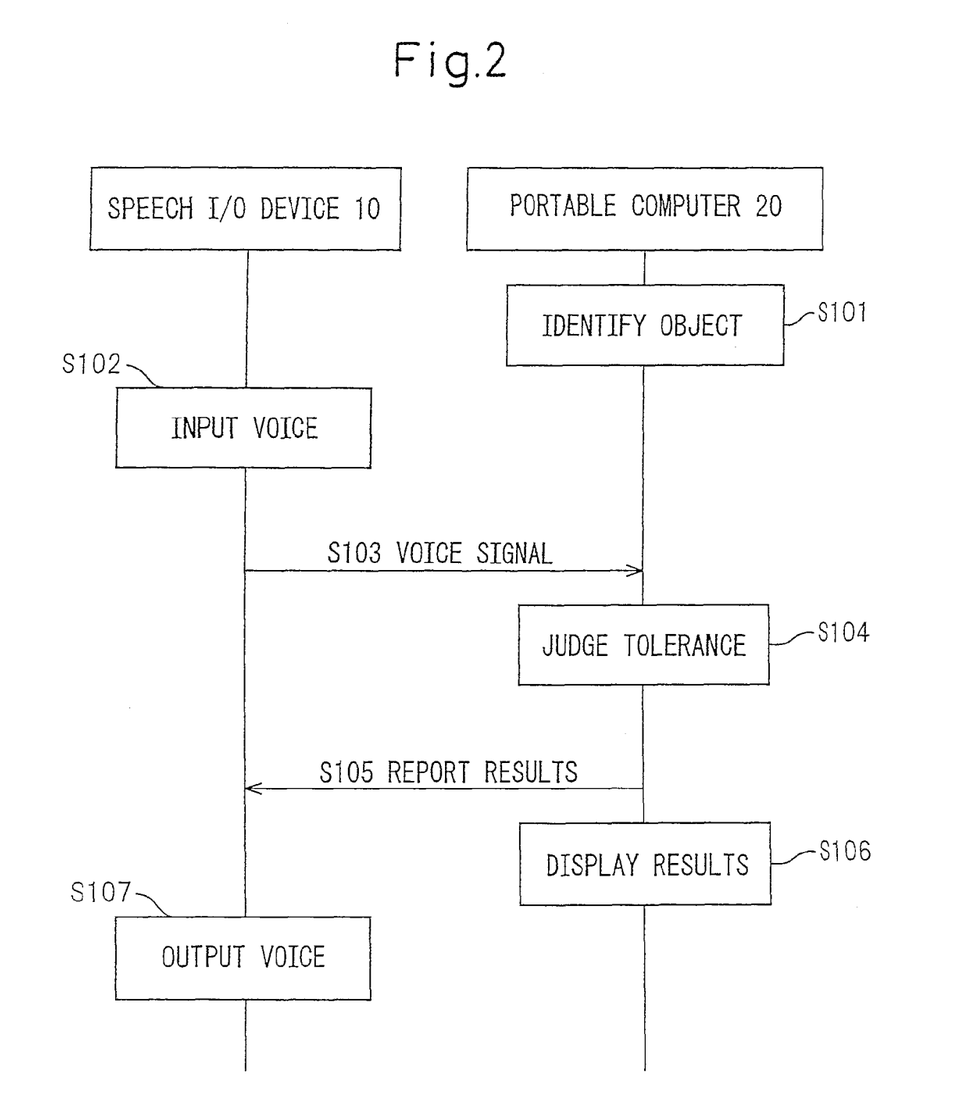
FIG. 2 is a view depicting an example of the flow of dimension measurement processing.

Using FIG. 2, an example of the flow of the dimension measurement processing of the dimension measurement system 1 will be explained.

First, a worker uses the read unit 27 of the information processing device 20 to scan the ID of a measured object and thereby identify the object (S101). Next, the worker measures the dimensions of the object by a tape measure or other measurement means and says the width, length, and other information of the object. By this, the generated voice is converted to a voice signal through the in-ear microphone 11 (S102).

The voice signal is transferred as a wireless signal from the speech I/O device 10 to the information processing device 20 (S103). When receiving the voice signal, the information processing device 20 matches the product specification information stored in the storage unit 28 against the ID and judges if the measurement value is within a predetermined tolerance (S104).

The result is transmitted from the information processing device 20 to the speech I/O device 10 (S105). Further, the information processing device 20 displays the result on the display unit 26 so that the worker can also confirm it visually (S106). The speech I/O device 10 receives the judgment result (of whether the measurement value is within the reference value) and outputs the judgment result by voice toward the eardrum of the worker through the in-ear microphone 11 (S107). By this, the measurement of one object ends. The worker then continues measurement on the next object. Note that, at the end of the measurement of one object, the worker may detect the ID of the next object, input completion through the input unit 25 of the information processing device 20, and use voice output (for example, say "next" etc.) to move on to the measurement of the next object. Further, the record of the dimension measurement work is transmitted to the control computer 40 after the measurement of dimensions of one object is finished or after measurement of a plurality of objects in batch processing. By this, the processing for dimension measurement ends.

Figure 3:
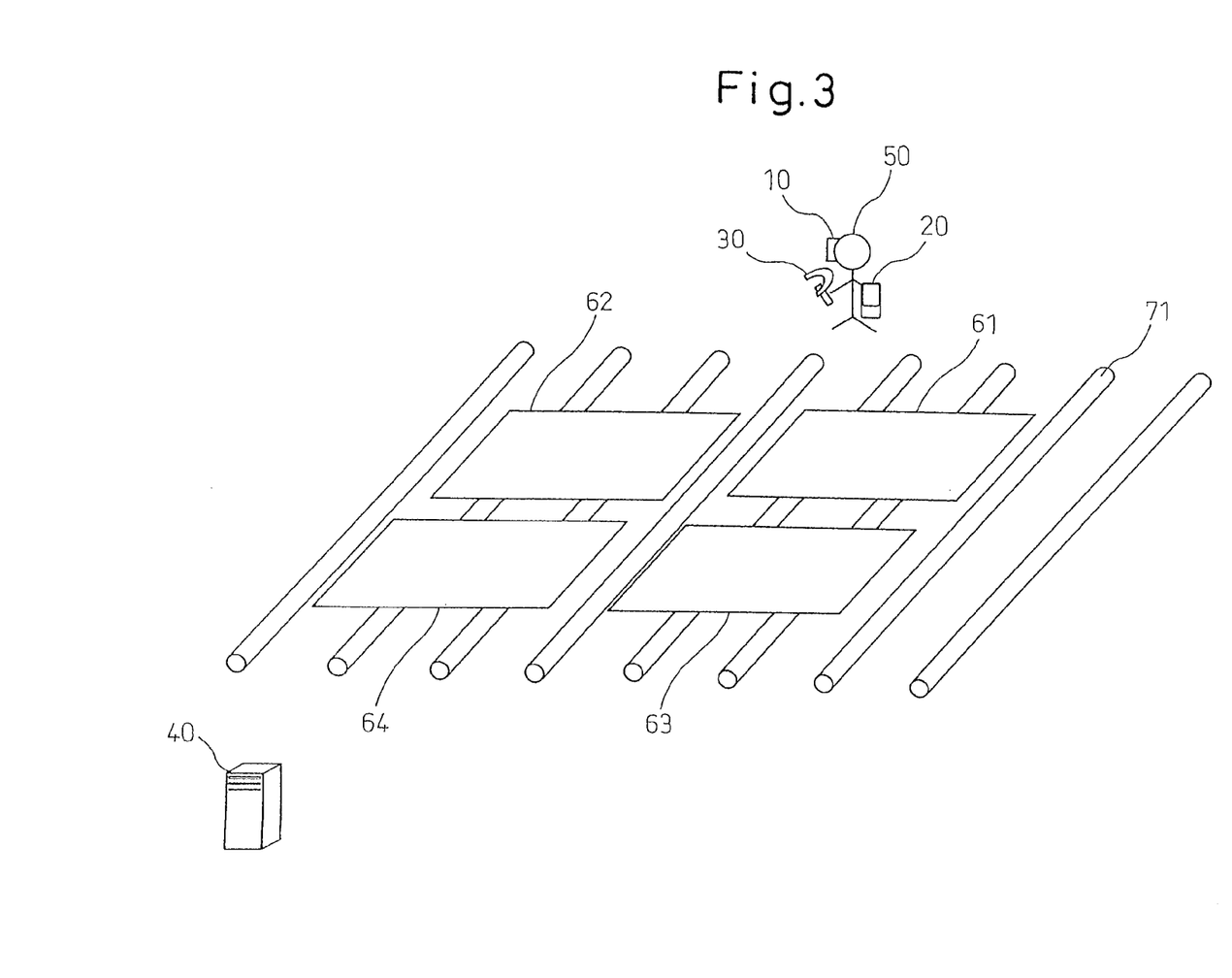
FIG. 3 is a view explaining the measurement of dimensions of steel using a dimension measurement system.

Using FIG. 3, as an example of dimension measurement, the measurement of dimensions of steel using the dimension measurement system will be explained. A worker 50 fixes the speech I/O device 10 on his head, attaches the information processing device 20 to his waist, and holds the digital micrometer 30 in his hand. The worker 50 measures the dimensions of steel 61 to 64 moving on the roller conveyor 71. The worker 50 uses the information processing device 20 to scan the bar code from any one of the steel 61 to 64 being transported by the roller conveyor 71 so as to identify the objects for dimension measurement. As explained using FIG. 2, the worker 50 measures steel that has been identified (S101) with a tape measure and the like and says the result, whereupon this voice is obtained by the speech I/O device (S102). Next, noise is reduced at the speech I/O device 10 (S103), and judgment is performed with the information processing device 20 (S103 and S104). The result is communicated through the in-ear microphone 11 of the speech I/O device 10 to the worker 50 (S105 and S107).

In this way, the present dimension measurement system 1 is able to measured the dimensions of steel in a steelmaking plant under loud noise along with the above variety of effects. However, the present dimension measurement system 1 is not limited to use in steel plants and can be applied to measurement of dimensions of any objects under loud noise.

Figure 4:
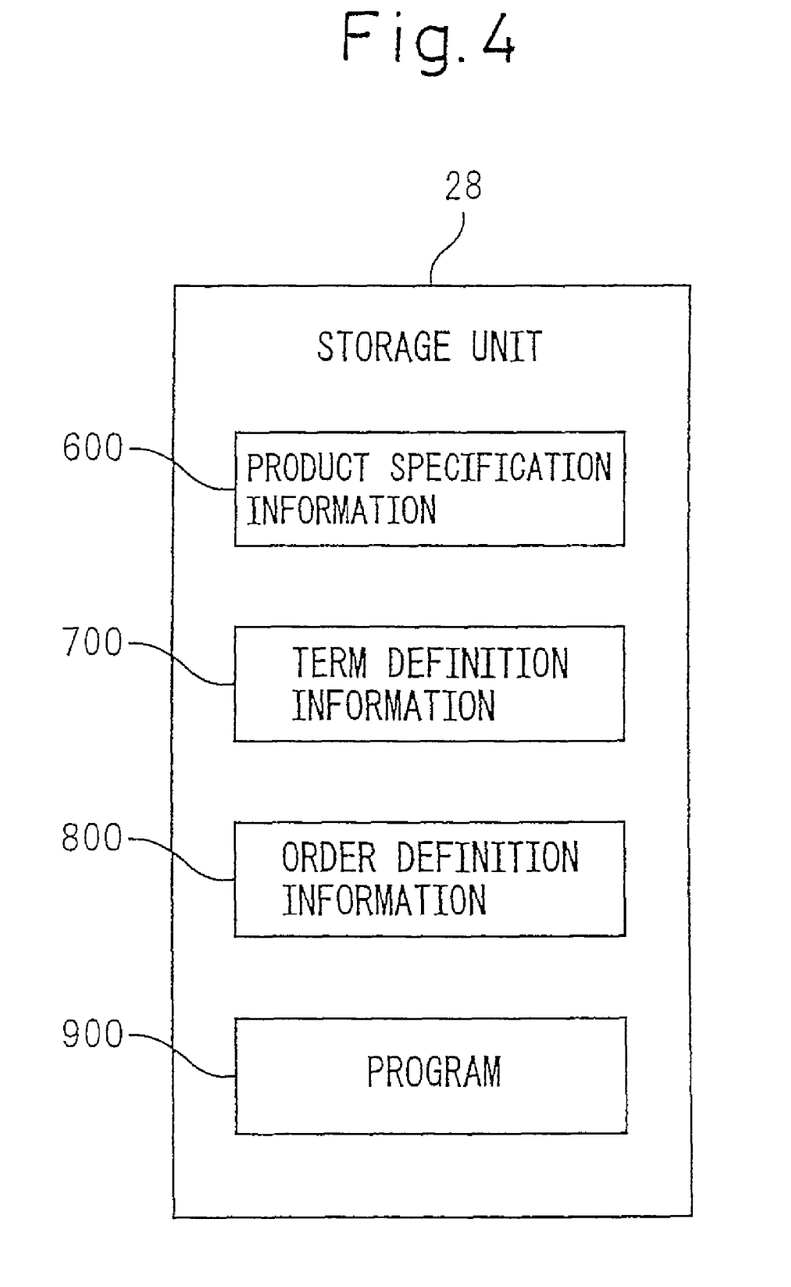
FIG. 4 is a view depicting an example of a program and data stored in a storage unit.

FIG. 4 is a view depicting an example of a program and data stored in the storage unit. Stored in the storage unit 28, for example, are product specification information 600, term definition information 700, order definition information 800, and a program 900.

The product specification information 600 includes object specification information in which the specification information of the object, that is, the dimension information, is input. For example, when the object is a steel material, the identification information (ID) of the steel material and the dimension specifications, that is, the length, width, thickness, and the tolerances of each, are input into the product specification information 600.

The term definition information 700 is information including the types and/or units of dimensions corresponding to specific terms. When the speech recognition function recognizes a specific term from the voice signal, the information processing device 20 refers to the term definition information 700 by the judgment function to thereby identify the type and/or unit of the dimension corresponding to the recognized specific term. The information processing device 20 uses the judgment function to judge if the dimension measurement value identified by the type and/or unit is within the tolerance specified by the type and/or unit.

The order definition information 800 is information including the types and/or units of dimensions corresponding to the information having an ordered sequence. The information processing device 20 refers to the order definition information 800 through the judgment function to assign a sequence of order to the voice signals and assigns a type and/or unit to each information assigned an order. The information processing device 20 uses the judgment function to refer to the order definition information 800 to thereby identify the type and/or unit of the dimension corresponding to a voice signal assigned an order. The information processing device 20 uses the judgment function to judge if the dimension measurement value identified by type and/or unit is within the tolerance specified by the type and/or unit.

Figure 5:
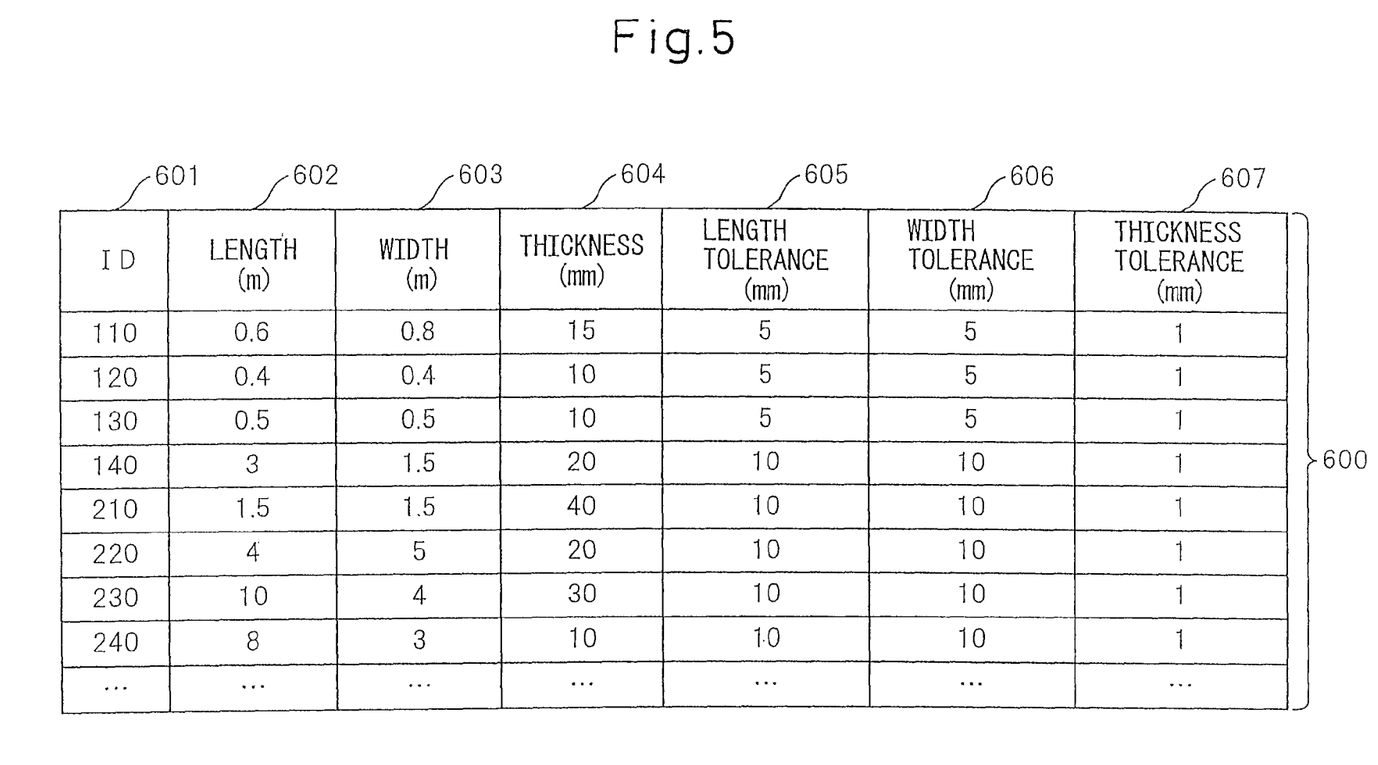
FIG. 5 is a view depicting an example of product specification information.

FIG. 5 is a view depicting an example of product specification information. The product specification information 600 depicted in FIG. 5 is information specifying the identification information (ID) of a product and the dimensional specifications of a product. The product specifications include for example the length, width, thickness, and tolerances for each and are specifications set for manufacturing a product. The product specification information 600 includes an identification information (ID) column 601, length column 602, width column 603, thickness column 604, length tolerance column 605, width tolerance column 606, and thickness tolerance column 607. For example, in the first row of the product specification information 600, a steel material indicated by the ID "100" of the ID column 601 is indicated as having a length of "0.6" (m), width of "0.8" (m), thickness of "15" (mm), length tolerance of "5" (mm), width tolerance of "5" (mm), and thickness tolerance of "1" (mm). The information processing device 20 refers to the product specification information 600 to thereby match the ID read by the read unit 27 with an ID input in the identification information column 601. The information processing device 20 judges if the "length" etc. corresponding to the ID matched in the product specification information 600 and the actual measured "length" etc. are within the tolerances of input in the product specification information.

Figure 6:
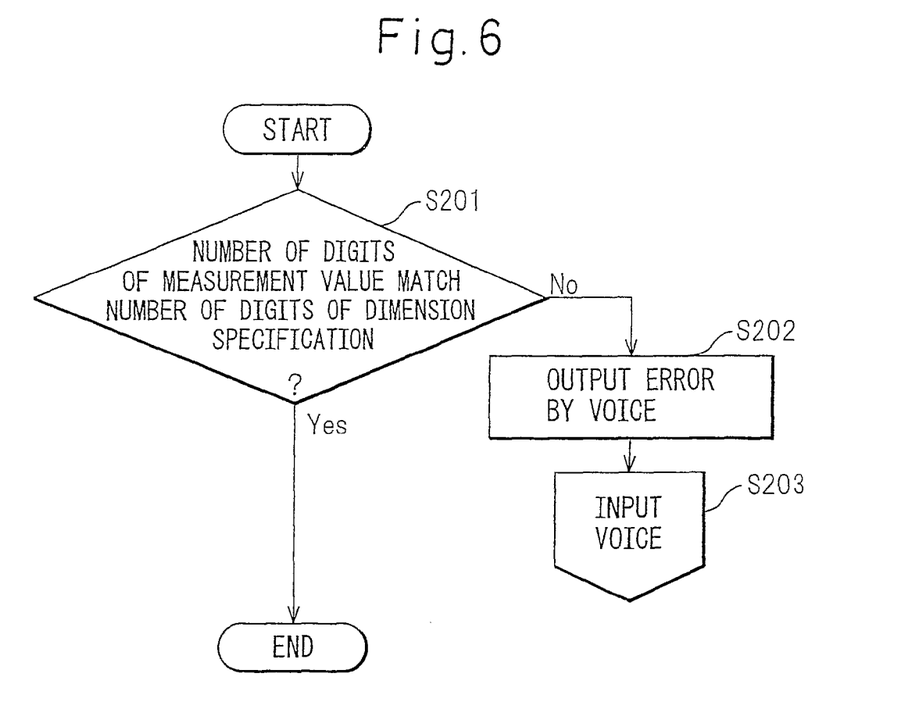
FIG. 6 is a view depicting an example of digit matching processing.
Figure 9:
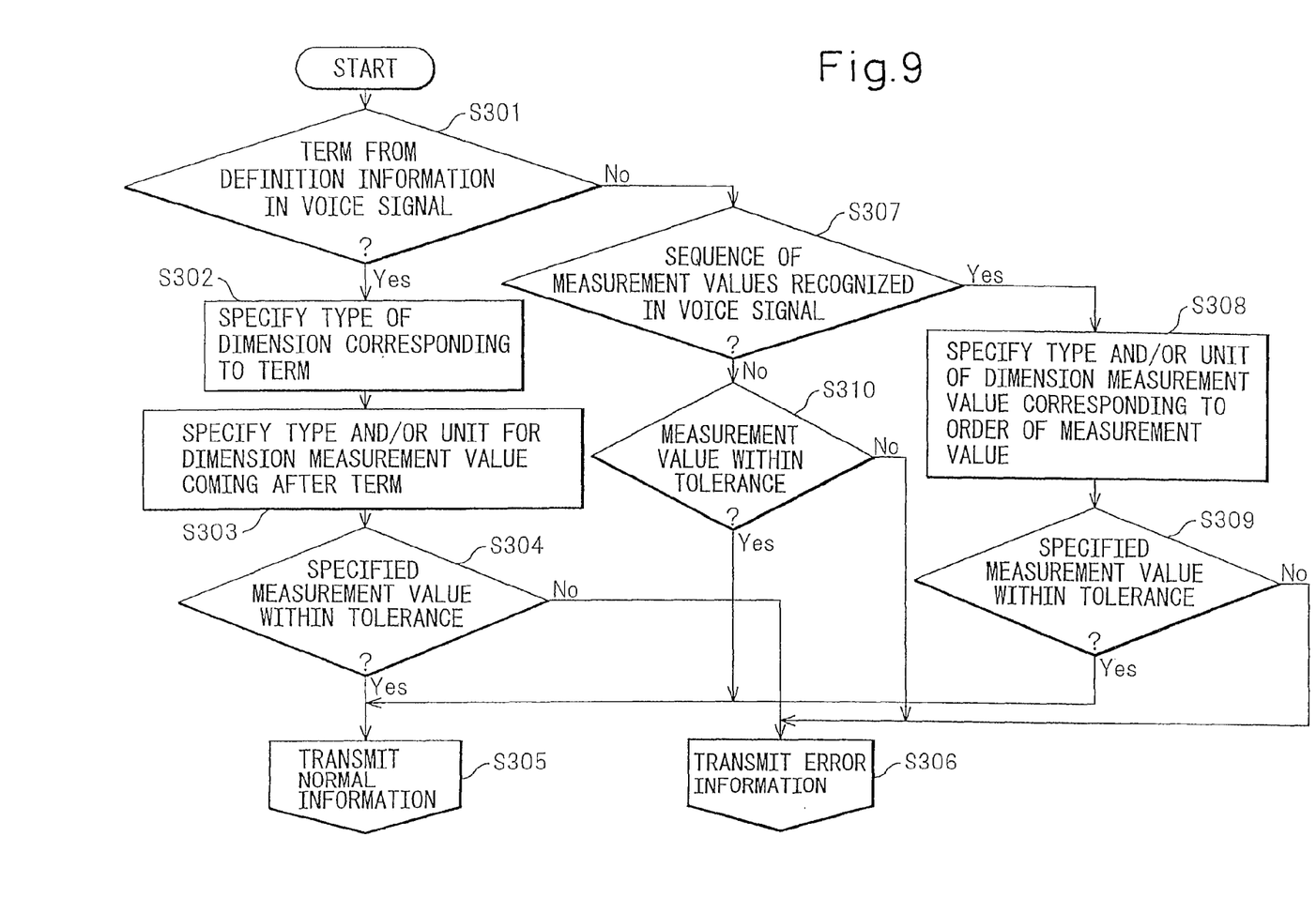
FIG. 9 is a flowchart depicting an example of a judgment function.
Figure 10:
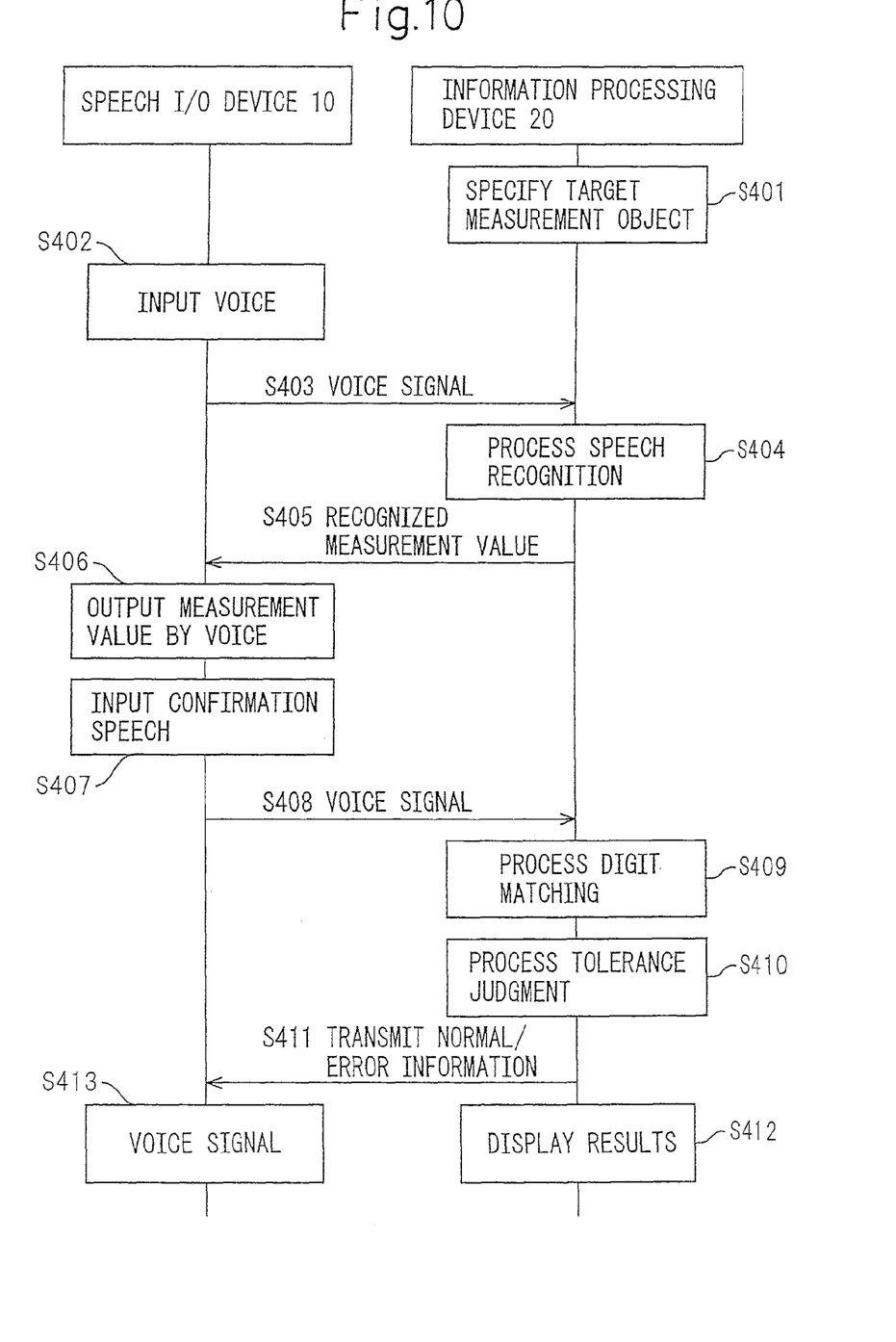
FIG. 10 is a view depicting an example of the flow of dimension measurement processing.

FIG. 6 is a view depicting an example of digit matching processing. As depicted in FIG. 5, the unit differs in accordance with the type of the dimension. For example, the unit for length is "m", however, the unit for thickness is "mm". For example, there are cases when a measurer will mistakenly perceive the unit of length for the dimensions of a steel material to be "mm" and say "600" for what should normally be "0.6". Therefore, as depicted in FIG. 6, the judgment function judges if the number of digits of the measurement value recognized by the speech recognition function matches the number of digits of the dimension specifications indicated in the product specification information 600 (S201). If the number of digits of the measurement value does not match the number of digits of the dimension specifications (S201 No), the information processing device 20 transmits error information to the speech I/O device 10, then the speech I/O device 10 outputs the error information to the operator by voice (S202). The operator again confirms what the measurement value is and outputs it by voice (S203). If the number of digits of the measurement value matches the number of digits of the dimension specifications, a later mentioned processing using FIG. 9 is performed.

The tolerance judgment judges if the measurement value itself is different from the dimension specifications, however, digit matching processing can check the mistakes of workers that originate from mistaken judgment of units. Due to this, additional processing to deal with abnormalities upon re-measurement etc. of a product caused when outside the range of tolerance can be reduced.

Figure 7:
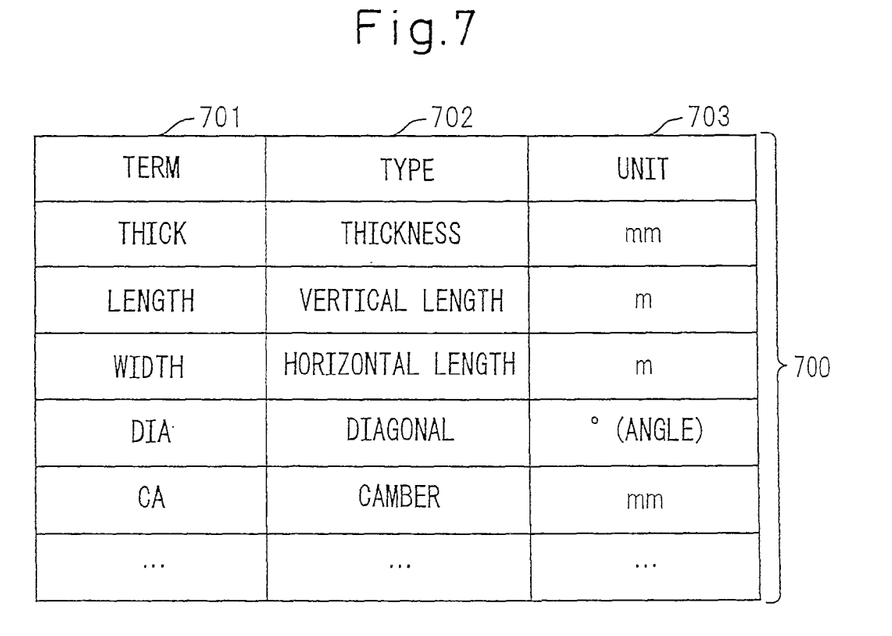
FIG. 7 is a view depicting an example of term definition information.

FIG. 7 is a view depicting an example of term definition information. The term definition information 700 depicted in FIG. 7 is information specifying the terms that are speech recognized, the types of the dimensions, and the units of the dimensions. The term definition information 700 includes a term column 701, type column 702, and unit column 703. The information processing device 20 refers to the term definition information 700 and thereby judges if a speech recognized term "thick" is the "thick" indicated in the term column 701. Further, the information processing device 20 judges that the "thick" depicted in the term column 701 corresponds to the "thickness" depicted in the type column 702 of the same row and judges that the next measurement value of the dimension to be recognized after "thick" is the unit "mm" of the unit column 703 of the same row.

Therefore, when the information processing device 20 speech recognizes the "thick 500" from the voice signal, the information processing device 20 refers to the term definition information 700 and identifies that the measurement value is a "thickness of 500 mm". Further, the information processing device 20 judges if the measurement value specified by "thickness" and "unit" is within the tolerance stipulated by the ID of the product specification information 600.

Figure 8:
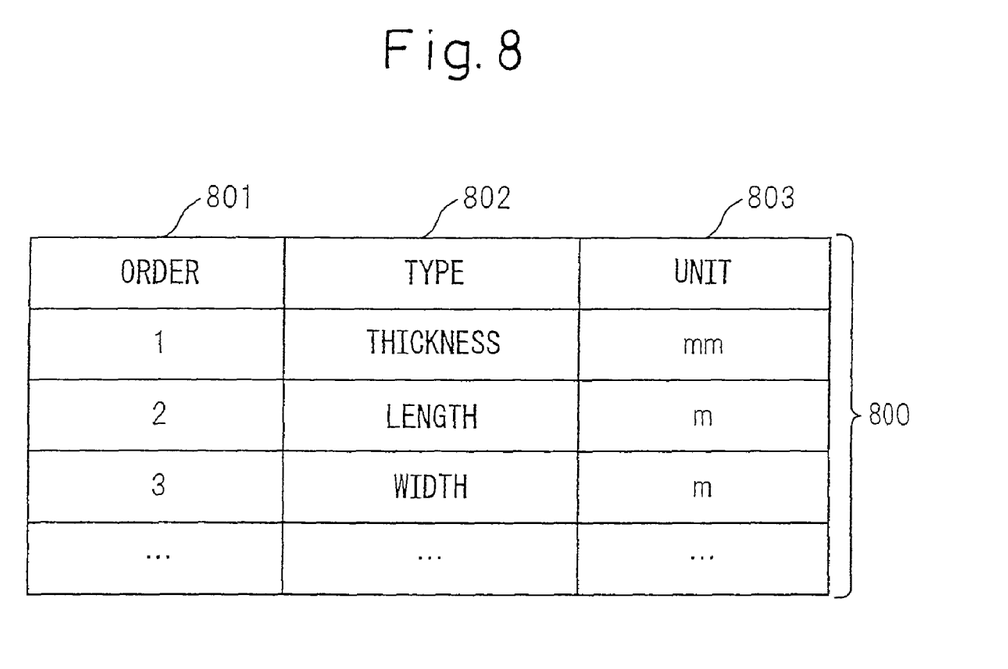
FIG. 8 is a view depicting an example of order definition information.

FIG. 8 is a view depicting an example of order definition information. The order definition information 800 depicted in FIG. 8 is information which specifies the dimension specifications and units with respect to speech recognized measurement values which are assigned a sequence of order. The order definition information 800 includes an order column 801, type column 802, and unit column 803. In the first row of the order definition information, the measurement value indicated by the "1" of the order column 801 is depicted as being of the "thickness" type and having units that are in "mm". Once the information processing device 20 performs speech recognition and obtains "100 2.5 1.2" from the voice signal, the information processing device 20 assigns the numbers "1", "2", "3" to the measurement values "100", "2.5", "1.2" recognized from the ordered voice signals, respectively. Further, the information processing device 20 specifies, in the order definition information 800, the dimension types of the type column 802 and the units of the unit column 803 that correspond to the order and associates the dimension types and units with the measurement values. For example, the information processing device 20 judges that the recognized voice of the order "1" is the "thickness is 100 mm", the recognized voice of the order "2" is the "length is 2.5 m", and the recognized voice of the order "3" is the "width is 1.2 m". The information processing device 20 judges if the measurement value specified by the type and unit is within the tolerance stipulated by the ID of the product specification information 600.

FIG. 9 is a flowchart depicting an example of the judgment function. The information processing device 20 judges if a term indicated in the term definition information 700 is included in the voice signal (S301). If a term indicated in the term definition information 700 is included (S301 Yes), the term definition information 700 is referenced and the type of the dimension corresponding to the term is identified (S302), then the routine proceeds to S303. If no term indicated in the term definition information 700 is included (S301 No), the routine proceeds to step S307.

The information processing device 20 specifies the type and/or unit of the dimension measurement value which follows the term in the voice signal (S303). The information processing device 20 judges if the dimension measurement value specified by the type and/or unit is within the tolerance specified by the type and/or unit (S304). If the dimension measurement value is within the tolerance (S304 Yes), the information processing device 20 generates normal information in the speech I/O device 10 (S305). If the dimension measurement value is not within the tolerance (S304 No), the information processing device 20 generates error information in the speech I/O device 30 (S306).

At S307, it is judged if a succession of measurement values can be recognized in the voice signal. If a succession of measurement values can be recognized (S307 Yes), the information processing device 20 specifies the order of the measurement values that are recognized in the sequence, refers to the order definition information 800, and specifies the types and/or units of the dimension measurement values corresponding to the order of the measurement values (S308). The information processing device 20 judges if the measurement values of the specified types and/or units are within the tolerances of the object specified by the types and/or units in the product specification information 600 (S309). If the dimension measurement values are within the tolerance (S309 Yes), the information processing device 20 creates normal information in the speech I/O device 10 (S305). If the dimension measurement values are not within the tolerance (S309 No), the information processing device 20 creates error information in the speech I/O device 30 (S306).

If a sequence of measurement values cannot be recognized (S307 No), any one of the dimensions depicted in the dimension information in the product specification information 600 is compared with a measurement value to judge if the measurement value is within the tolerance of the object (S310). Note that, at S310, it is judged if the measurement value for the next type of dimension following the type of dimension for which judgment of tolerance was performed is within the tolerance. For example, when the ID "110" depicted in FIG. 5 is specified as being the object and if the measurement value is "length", tolerance judgment may be carried out in sequence from left to right on the columns in the product specification information 600, so the next one will be "width". If the dimension measurement value is within the tolerance (S310 Yes), the information processing device 20 generates normal information in the speech I/O device 10 (S305). If the dimension measurement value is not within the tolerance (S310 No), the information processing device 20 generates error information in the speech I/O device 30 (S306).

As depicted in S302, by specifying the type of the dimension in accordance with the term, the type of dimension of the object can be recognized. Further, by specifying the term as an abbreviation, the spoken work of the worker is simplified, and work load in speaking can be reduced.

As depicted in S307, by identifying the measurement values by the order and by adding associations for types and units of dimensions, the worker is not required to specify the types of the dimensions by speaking. Thereby, the spoken work of the worker is simplified, and the work load in speaking can be reduced.

FIG. 9 explains an example of the flow of the dimension measurement processing by the dimension measurement system.

First, the worker uses the read unit 27 of the information processing device 20 to scan the ID of the object to be measured and thereby identify the object (S401). That is, he searches for an ID within the product specification information 600 matching the ID read by the read unit 27 and obtains the dimension specifications of the object to be measured.

Next, the worker measures the dimensions of the object by a tape measure or other measurement means and says the measurement values of the dimensions of the object. The generated speech is input into the speech I/O device 10 and converted into a voice signal by the speech I/O device 10 (S402). The voice signal is transferred as a wireless signal from the speech I/O device 10 to the information processing device 20 (S403).

The information processing device 20 uses the speech recognition function to recognize the measurement value from the voice signal (S404). The information processing device 20 transmits the recognized measurement value to the speech I/O device 10 (S405). The speech I/O device 10 outputs the transmitted measurement value by voice (S406). When the measurement value of the voice output is the same as the voice output spoken by the worker, the worker, for example, says "OK" to accept it, while when different, inputs the dimension measurement value by voice once again (S407). The voice signal indicating "OK" or "dimension measurement value" is transmitted from the speech I/O device 10 to the information processing device 20 as a wireless signal (S408). When a voice signal for OK is recognized, the information processing device 20 performs the processing at S409, while when a voice signal for the measurement value is recognized, S405 is repeated once again.

The information processing device 20 performs digit matching processing (S409). Digit matching processing is as explained using FIG. 6. If the number of digits of the measurement value does not match the number of digits of the dimension specifications, the worker once again says the dimension measurement value and inputs voice into the speech I/O device 10. If the number of digits of the measurement value matches the number of digits of the dimension specifications, the information processing device 20 performs tolerance judgment processing (S410). The tolerance judgment processing is as explained using FIG. 9. As a result of the tolerance judgment processing, the generated error information or normal information is transmitted to the speech I/O device 10 (S411). Further, the information processing device 20 displays the result on the display unit 26 so that the worker can visually confirm it as well (S413). The speech I/O device 10 transmits the judgment result, that is, normal information or error information, and outputs it toward the eardrum of the worker by voice through the in-ear microphone 11 (S414). In this way, the measurement of one object ends, then the worker continues and measures the next object. Note that, once the measurement of one object is over, the worker may detect the ID of the next object to be measured, input through the input unit 25 of the information processing device 20 that the task has been completed, and use voice output (for example, say "next" etc.) to proceed to measure the next object. Further, the actual results of the dimension work are sent to the control computer 40 after the dimension measurement of one object ends or after a plurality of objects have been measured in batch processing. Thus, processing for dimension measurement ends.

As depicted in S405, the measurement value which the information processing device 20 recognized is once again sent to the speech I/O device 10. As depicted in S406, by outputting the measurement value by voice to the worker, speech recognition processing errors from the information processing device 20 can be avoided. Thereby, before the digit matching processing (S409) and tolerance judgment processing (S410), speech recognition is confirmed, whereby additional processing to deal with abnormalities upon re-measurement etc. of a product that are generated when outside the range of tolerance can be reduced.

All examples and conditional language recited herein after intended for pedagogical purposes to aid the reader in understanding the principles of the invention and the concepts contributed by the inventor to furthering the art and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

EXPLANATION OF CODE

1 DIMENSION MEASUREMENT SYSTEM
10 SPEECH I/O DEVICE
11 IN-EAR microphone
18, 21, 46 COMMUNICATION UNIT
20 INFORMATION PROCESSING DEVICE
26 DISPLAY UNIT
28 STORAGE UNIT
30 DIGITAL MICROMETER
40 CONTROL COMPUTER

The invention claimed is:
1. A dimensional measurement system comprising:
a speech I/O device fit in an ear canal of a worker, generating a voice signal from vibration in the air emitted from an eardrum of the worker and propagated inside the ear canal, and outputting the voice signal; and an information processing device including a memory unit, the memory unit storing term definition information associating predetermined term with type and unit of dimension measurement value, the information processing device that is configured to:
recognize a measurement value of a dimension of an object from the voice signal that the speech I/O device output;
judge if the measurement value satisfies a reference value of the object;
recognize a word included in the voice signal,
when a predetermined term included in the term definition information that is read from the memory unit corresponds to the recognized word, specify a measurement value that is recognized after the recognized word by a type and unit of dimension measurement value associated with the predetermined term corresponding to the recognized word,
recognize an order of recognized measurement values when the predetermined term in the read term definition information is not included in the voice signal; and
specify a measurement value by the type and unit of a dimension measurement value corresponding to the order of the measurement value, using information associated an order of measurement values, and types and units of dimensions.

2. The dimensional measurement system as set forth in claim 1, wherein
the information processing device transmits a measurement value to the speech I/O device, and
the speech I/O device outputs by voice the transmitted measurement value.

3. The dimension measurement system as set forth in claim 1 or 2, wherein the information processing device is further configured to:
recognize the number of digits of the recognized measurement value of the object; and,
output by voice an error result through the speech I/O device when the number of digits of the recognized measurement value is different from the number of digits according to the specification of the object.

4. The dimensional measurement system as set forth in claim 1 or 2, wherein
the information processing device is configured to transmit judgment results of the judgment to the speech I/O device, and
the speech I/O device outputs by voice the transmitted judgment result.

5. The dimensional measurement system as set forth in claim 1 or 2, further comprising a digital micrometer or digital caliper measuring the dimensions of the object and wirelessly transmitting the measurement values.

6. The dimensional measurement system as set forth in claim 1 or 2, wherein the information processing device further comprises an ID reading means for reading identification information relating to the object.

7. The dimensional measurement system as set forth in claim 1 or 2, wherein
information depicting the reference value is transmitted to the information processing device from a control computer managing the specifications of the objects, and
the information processing device is further configured to:
transmit the judgment result to the speech I/O device,
receive information depicting the acceptance of the measurement value received from the speech I/O device, and
transmit the accepted measurement value to the control computer.

8. An information processing device connected to a speech I/O device fit in an ear canal of a worker, generating a voice signal from vibration in the air emitted from an eardrum of the worker and propagated in the ear canal, and outputting the voice signal, the information processing device comprising:
a memory unit that stores term definition information associating predetermined term with type and unit of dimension measurement value; and
a processing unit that is configured to:
recognize a measurement value of a dimension of an object from the voice signal that the speech I/O device output; and,
judge if the measurement value satisfies a reference value of the object;
recognize a word included in the voice signal,
when a predetermined term included in the term definition information that is read from the memory unit corresponds to the recognized word, specify a measurement value that is recognized after the recognized word by a type and unit of dimension measurement value associated with the predetermined term corresponding to the recognized word,
recognize an order of recognized measurement values when the predetermined term in the read term definition information is not included in the voice signal; and
specify a measurement value by the type and unit of a dimension measurement value corresponding to the order of the measurement value, using information associating an order of measurement values, and types and units of dimensions.

9. The information processing device as set forth in claim 8, wherein the processing unit further configured to:
recognize the number of digits of the recognized measurement value of the object; and,
output by voice an error result through the speech I/O device when the number of digits of the recognized measurement value is different from the number of digits according to the specification of the object.

10. The information processing device as set forth in claim 8 or 9, further comprising an ID reading means for reading identification information relating to the object.

* * * * *